Aug. 22, 1939. G. W. MISNER 2,170,249
AUTOMATIC WEIGHING DEVICE
Filed May 22, 1937
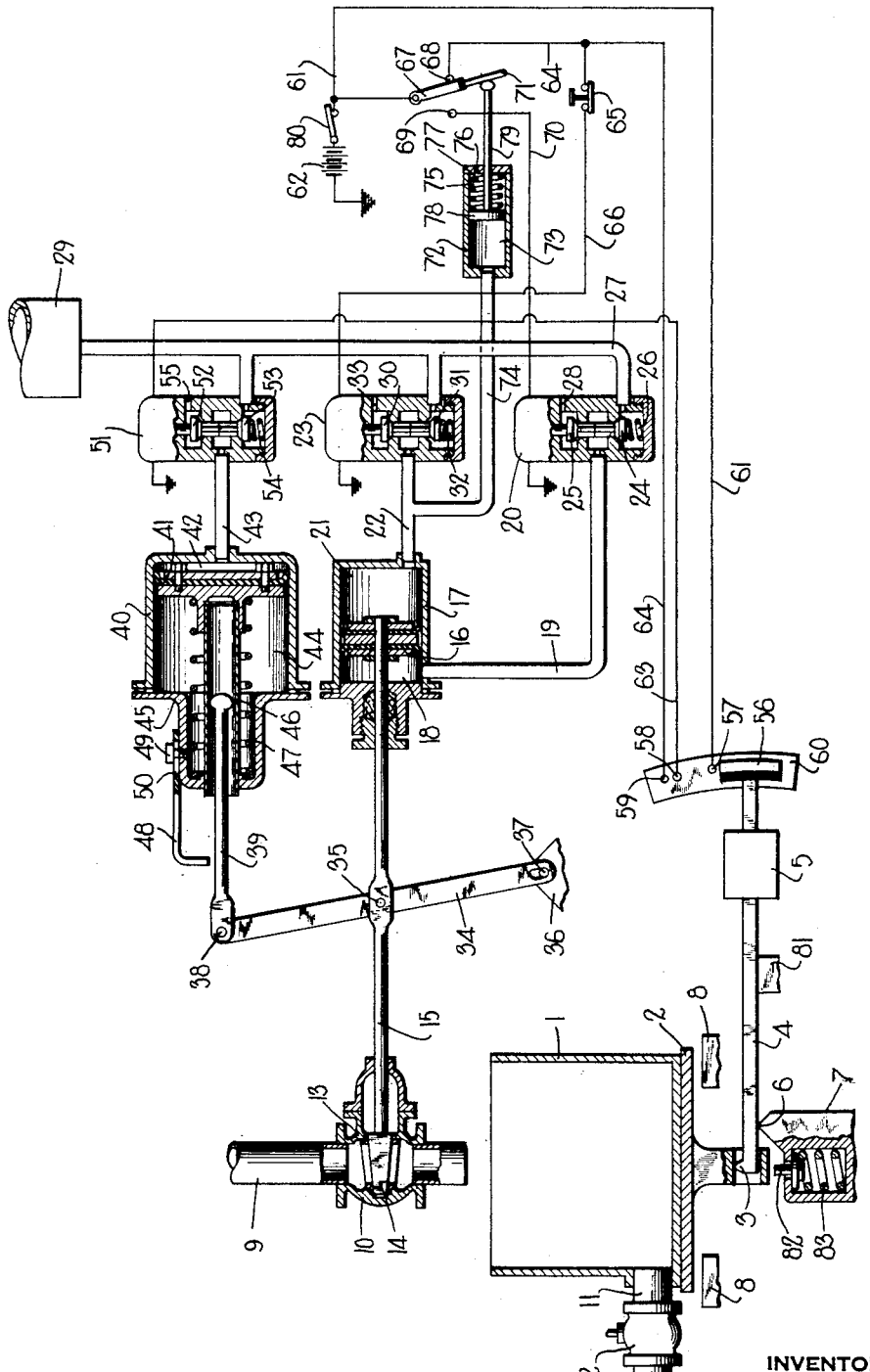
INVENTOR
GEORGE W. MISNER.
BY Wm. M. Cady
ATTORNEY Patented Aug. 22, 1939

2,170,249

UNITED STATES PATENT OFFICE 2,170,249

AUTOMATIC WEIGHING DEVICE

George W. Misner, East McKeesport, Pa., assignor to The Westinghouse Air Brake Company, Wilmerding, Pa., a corporation of Pennsylvania Application May 22, 1937, Serial No. 144,218

10 Claims. (Cl. 249—42)

This invention relates to weighing devices and more particularly to mechanism of this type adapted to operate automatically to measure a predetermined quantity of matter.

In machines, such as concrete mixers, it is desirable to have means which will automatically operate to quickly and accurately measure the proper quantity of water for use in making each batch of concrete, and the principal object of the invention is to provide improved means for accomplishing this result.

Other objects and advantages of the invention will be apparent from the following more detailed description thereof.

In the accompanying drawing, the single figure is a diagrammatic view of a weighing mechanism embodying the invention.

As shown in the drawing, the improved mechanism comprises a measuring tank 1 mounted on a scale platform 2 which is pivotally carried by a knife edge 3 provided on one end of a scale beam 4. A counterweight 5 is provided on the beam 4 near the opposite end thereof, and said beam is pivotally supported intermediate its ends on a knife-edge 6 provided on a fixed portion 7 of the scales. Fixed stops 8 are provided for engagement with the platform 2 in its lowermost position, which will be hereinafter described.

A water supply pipe 9, connected to any suitable source of water supply, is provided to supply water to the tank 1 and a valve device 10 is provided in said pipe for controlling such supply. The tank 1 has an outlet pipe 11 in which there is provided a drain valve 12 for draining water from said tank to the point of use in the mixer.

The valve device 10 for controlling the supply of water from the supply pipe 9 to the tank 1 may be of the gate type comprising a casing 13 containing a slidable valve element 14 movable to various positions in the casing for varying the rate of supply of water to said tank and for closing off such supply. The supply valve 14 is connected to one end of a rod 15, the other end of which is connected to a movable abutment preferably in the form of a double-acting piston 16 which is slidably mounted in a control cylinder 17. The piston 16 has at one side a chamber 18 connected to a pipe 19 which leads to a supply magnet valve device 20 and at the opposite side a chamber 21 which is connected to a pipe 22 leading to a cut-off magnet valve device 23.

The supply magnet valve device 20 comprises a magnet and two oppositely seating valves 24 and 25 controlled by said magnet and the opposing pressure of a spring 26 acting on the valve 24.

The valve 24 is provided for controlling communication from a pipe 27 to the pipe 19, while the valve 25 is provided for controlling communication from pipe 19 to an atmospheric release port 28. The pipe 27 is constantly supplied with fluid under pressure from any suitable source, such as a reservoir 29.

The cut-off magnet valve device 23 comprises a magnet and two oppositely seating valves 30 and 31 controlled by said magnet and the opposing pressure of a spring 32. The valve 30 is provided for controlling communication from the pipe 22 to an atmospheric exhaust port 33, while the valve 31 is provided for controlling communication from the pipe 22 to the fluid pressure supply pipe 27.

A lever 34 is pivotally connected intermediate its ends to the valve rod 15 by means of a pin 35. One end of this lever is pivotally connected to any fixed part 36 of the mixer by means of a pin 37 extending through a slot in the lever, while the opposite end of the lever is pivotally connected by means of a pin 38 to one end of a push rod 39, associated with a throttling cylinder device 40.

The throttling cylinder device 40 comprises a casing containing a movable abutment preferably in the form of a single acting piston 41 having at one side a chamber 42 connected to a pipe 43 and having at the opposite side a non-pressure chamber 44. A non-pressure head 45 is secured to the casing of the cylinder 40 and slidably extending through a bore in the end of said non-pressure head is a hollow piston rod 46 the inner end of which is secured to the piston 41. A coil return spring 47 surrounding the hollow piston rod 46 is interposed between the end of the non-pressure head 45 and the piston 41 for urging said piston to the position shown in the drawing. The non-pressure chamber 44 is in constant communication with the atmosphere in any suitable manner, such as by way of clearance space which normally exists between the hollow piston rod 47 and the bore in the non-pressure head through which said rod operates.

An adjustable stop 48 is secured to the non-pressure head 45 by means of a screw 49 extending through a slot 50 in said stop and having screw-threaded engagement with said head. The outer end of this stop extends down into the path of movement of piston rod 46 so as to be engaged thereby for limiting outward movement of piston 41. The end of push rod 39, opposite that secured to lever 34, is slidably mounted within the hollow push rod 46, whereby the rod 39 may be moved relative to the rod 46, as will be hereinafter explained.

The pipe 43 connected to the throttling cylinder 40 leads to a throttling magnet valve device 51 which comprises a magnet and two oppositely seating valves 52 and 53 controlled by said magnet and the opposing pressure of a spring 54. The valve 52 is provided for controlling communication between the pipe 43 and an atmospheric exhaust port 55 while the valve 53 is provided for controlling communication between said pipe and the fluid pressure supply pipe 27.

An insulated contactor 56 is associated with the scale beam 4 and is movable therewith for effecting electrical connections between a fixed contact 57 and fixed contacts 58 and 59. The fixed contacts 57, 58 and 59 are adjustably secured in any suitable manner (not shown) to a stationary element 60 which may be made of any suitable insulating material so that the contacts will be insulated one from the other.

The contact 57 is connected by a wire 61 to any suitable source of electrical energy, such as a battery 62. The contact 58 is connected by a wire 63 to the throttling magnet valve device 51, and the contact 59 is connected by a wire 64 to one side of a two-point, manually operated break switch 65, the other side of said switch being connected by a wire 66 to the cut-off magnet valve device 23.

A two-way switch is provided which comprises a movable contact element 67 connected to the battery supply wire 61, a fixed contact 68 connected to wire 64 and adapted to be engaged by said movable contact upon movement thereof in one direction, and a fixed contact 69 adapted to be engaged by said element upon movement in the opposite direction, the contact 69 being connected to a wire 70 leading to the supply magnet valve device 20. A handle 71 is connected to the contact element 67 for manually moving said element to its different positions.

A reset cylinder 72 is provided which comprises a casing containing a piston 78 having at one side a chamber 73 connected to a pipe 74 leading to the pipe 22, and having at the opposite side a chamber 75 which is open to the atmosphere through a breather port 76 and which contains a spring 77 acting on said piston for urging same in a direction towards the left hand. The piston 78 is provided with a stem 79 slidably mounted in a suitable bore through one end wall of the cylinder 72 and disposed in operating alignment with the switch handle 71.

A switch 80 is provided for disconnecting the battery 62 from the current supply wire 61 when the weighing mechanism is not being used.

In operation, let it be assumed that the tank 1 is empty, the drain valve 12 is closed, and it is desired to measure out a predetermined quantity of water in the tank 1. With the tank 1 empty, the counterweight 5 acting on one end of the scale beam 4 will hold said tank in the elevated position shown in the drawing, which position may, if desired, be defined in any suitable manner, such as for instance by a stop 81 adapted to engage the scale beam in this position.

Let it further be assumed that the switch 80 is closed supplying current from battery 62 to the supply wire 61, and that the movable contact element 67 is in its normal position, shown in the drawing, supplying current from the supply wire 61 to the wire 64. Current thus supplied to the wire 64 is transmitted through the switch device 65 and wire 66 to the cut-off magnet valve device 23 the magnet of which is thus energized and acts to hold the valve 30 seated and the valve 31 unseated against the pressure of the spring 32. With the valve 30 seated communication is closed from the pipe 22 to the exhaust passage 23, while with the valve 31 unseated fluid under pressure is supplied from pipe 27 to the pipe 22 leading to piston chamber 21 in the cylinder 17 and to piston chamber 73 in the reset cylinder 72.

In this position of the switch contact element 67 the magnet of the supply magnet device 20 is deenergized which permits the spring 26 to hold the valve 24 seated and the valve 25 unseated, thereby opening piston chamber 18 in the cylinder 17 to the atmosphere by way of the pipe 19 and through the atmospheric exhaust passage 28. With the piston chamber 18 thus vented and chamber 21 at the opposite side of piston 16, supplied with fluid under pressure by energization of the magnet valve device 23, the piston 16 is held in the position shown in the drawing and thus acts to hold the valve 14 in the supply valve device 10 closed, thus preventing the flow of water from the supply pipe 9 to the tank 1.

Fluid supplied to pipe 22 by operation of the cut-off magnet valve device 23 also flows through pipe 74 to piston chamber 73 in the reset valve device 72 and therein acts on the piston 78 to hold same in the position shown in the drawing, in which position the piston rod 79 engages the handle 71 of the contact element 67 and maintains said element in engagement with the switch contact 68.

With the apparatus in its normal condition, as above described, if it is desired to measure out a predetermined quantity of water into the tank 1, the circuit through the magnet valve device 23 is opened by manually moving the switch contact element 67 from the position shown in the drawing to the position in which it engages contact 69, the piston 78 being of relatively small area so as to permit such manual movement against the pressure of fluid in the reset cylinder acting on said piston at this time. The magnet of the cut-off magnet valve device 23 is consequently deenergized which permits spring 32 to seat the valve 31 and unseat the valve 30 and thus cut off the supply of fluid under pressure to piston chambers 21 and 73 and vent said chambers to the atmosphere through the vent port 33. With the piston chamber 73 in the reset cylinder device 72 thus vented the pressure of spring 77 moves the piston 78 towards the left hand end of said cylinder and thereby pulls the piston rod 79 out of engagement with the handle 71 so as to permit the contact element 67 to remain in engagement with the switch contact 69 without manual pressure.

With the switch contact 67 engaging the contact 69 current is supplied from the battery 62 to the magnet of the supply magnet valve device 20, energizing said magnet and thereby seating the valve 25 and unseating the valve 24 against the pressure of the spring 26. The pipe 19 is thereby disconnected from the exhaust port 28 and connected to the fluid pressure supply pipe 27, so that fluid under pressure from said supply pipe is then supplied through pipe 19 to piston chamber 18 in the cylinder 17. With the chamber 21 at the opposite side of the piston 16 open to the atmosphere through the cut-off magnet valve device 23, the pressure of fluid thus supplied to chamber 18 and acting on said piston moves said piston towards the right hand into engagement with the end wall of the cylinder 17. This movement of the piston 16 acts through the rod 15 to move the supply valve 14 to its wide open position and thereby permit a maximum rate of flow of water from the supply pipe 9 to the tank 1.

When the rod 15 is thus operated to open the valve 14, lever 34 is turned about the fixed fulcrum pin 37 in a clockwise direction and moves the push rod 39 into the hollow push rod 46 towards the throttling piston 41, to a position in which there is just slight clearance between the end of said rod and said piston. In other words, the parts are so designed that the piston 41 will not interfere with the movement of the supply valve 14 to its fully open position just described.

When sufficient water is thus obtained in the tank 1 past the fully opened supply valve 14 to slightly overbalance the opposing force of the counterweight 5 on the scale beam 4, said tank begins to move downwardly and turn the scale beam 4 on the fixed fulcrum 6 in a counterclockwise direction. After the scale beam 4 is thus turned away from its normal position, the contactor 56 at the right hand end thereof moves into engagement with the fixed contact 57 which is connected to the battery supply wire 61. The scale beam then continues its turning movement as the quantity of water in the tank 1 is increased until at the time the quantity of water is increased to within a predetermined amount, such as five percent, of the total amount to be measured, the contactor 56 engages the fixed contact 58 thus electrically connecting the contacts 57 and 58.

When the contactor 56 connects the fixed contacts 57 and 58, battery current from wire 61 is supplied to wire 63 and from thence to the magnet of the throttling magnet valve device 51 which becomes energized and acts to seat the valve 52 and unseat the valve 53. The seating of valve 52 closes communication between piston chamber 42 of the throttling cylinder 40 and the atmospheric release port 55, while the unseating of valve 53 acts to supply fluid under pressure from the supply pipe 27 to pipe 43 and from thence to said chamber. The pressure of fluid thus supplied to piston chamber 42 and acting on the piston 41 overcomes the opposing pressure of the piston return spring 47 and moves said piston toward the left hand until the end of the hollow push rod 46 engages the stop 48. As the piston 41 is thus moved it engages the right hand end of the piston rod 39 and moves said rod and thereby the lever 34 to a position slightly to the right of that in which these parts are shown in the drawing. This movement of said lever acts to move the supply valve 14 from the wide open position, above described, to a partially closed position in which the rate of supply or flow of water from the supply pipe 9 to the tank 1 is restricted or reduced to a degree where it may be more accurately controlled.

It will be noted that the pressure of fluid in chamber 18 acting on the piston 16 opposes movement of the lever 34 to the throttling position by the pressure of fluid acting on the throttling piston 41, but the piston 41 is of sufficiently greater area than piston 16 to overcome the pressure on piston 16 and operate as above described.

As the final five percent of water load is thus supplied to the tank 1 at a restricted or a throttled rate, the scale beam 4 continues to turn in a counterclockwise direction, until at the time the desired quantity of water is obtained in said tank the contactor 56 moves into contact with the fixed contact 59, whereupon electric current is supplied from the supply wire 61 to wire 64 and from thence through the switch 65 to wire 66 leading to the cut-off magnet valve device 23.

The magnet of the cut-off magnet valve device is thereby energized and acts to seat the valve 30 and unseat the valve 31, whereupon fluid under pressure is supplied from the supply pipe 27 to the pipe 22 and from thence to piston chamber 21 in the cylinder 17 and to piston chamber 73 in the reset cylinder 72.

The pressure of fluid thus supplied to the reset cylinder and acting on the piston 78 moves said piston and thereby the rod 79 to the position shown in the drawing and this movement of said rod moves the switch contact element 67 out of engagement with the contact 69 and into engagement with the contact 68. As a result, the supply magnet valve device 20 is deenergized which permits spring 26 to seat the valve 24 and thus cut off the supply of fluid under pressure to chamber 16 in the cylinder 17, and unseat the valve 25 so as to vent said chamber to the atmosphere through the atmospheric port 28. This venting of fluid under pressure from the piston chamber 18 permits the pressure of fluid supplied to chamber 21 and acting on the opposite side of the piston 16 to move said piston and thereby the rod 15 and supply valve 14 towards the left hand to their normal position and thus fully close said valve and cut off all supply of water from the supply pipe 9 to the tank 1. It will be evident that as the lever 34 is turned by the piston 16 in closing the supply valve 14, the rod 39 freely moves outwardly in the hollow piston rod 47.

From the above description it will be noted that the initial relative large portion of water obtained in the tank 1 is supplied at a rapid rate through the wide open valve 14, while the final, relatively small portion is supplied to the tank at a relatively restricted or reduced rate so as to more accurately effect operation of the cut-off magnet valve device 23 to close the supply valve 14 when just the proper amount of water is obtained in said tank.

The weighing mechanism is adjusted to automatically weigh out, as above described, the quantity of water necessary for making a predetermined batch of concrete, the aggregate of which has a predetermined average wetness or water content. In case a batch of aggregate is encountered which is drier than usual, it will then be desirable or necessary to add a slightly greater amount of water than that automatically measured out. In such a case, the operator depresses the switch 65 to effect deenergization of the magnet of the cut-off magnet valve device 23 so as to thereby vent fluid under pressure from piston chamber 21 of the cylinder 17 and from piston chamber 73 of the reset cylinder 72. The operator then manually moves the switch contact element 67 into engagement with contact 69 for effecting energization of the magnet of the supply magnet valve device 20 so as to resupply fluid under pressure to piston chamber 18 and thus move the piston 16 towards the right hand. The extent of this movement of piston 16 is limited by the engagement of the push rod 39 with the throttling piston 41, which at this time is still in its left hand or throttling position, so that the valve 14 is only pulled outwardly to its partially open position, and as a consequence, the further, manually, controlled supply of water to the tank 1 is at the relatively restricted or reduced rate. When the desired, additional quantity of water is thus obtained in the tank 1, the operator releases the switch 65, with the result that the cut-off magnet valve device 23 is again energized and effects operation of the reset cylinder 72 to deenergize the supply magnet valve device 20, and of the piston 16 to close the supply valve 14.

After the desired quantity of water is obtained in the tank 1 the drain valve 12 is operated to release the water from said tank to the point of use, as a result of which, the counterweight 5 returns said tank to its normal, elevated position as shown in the drawing. As the tank 1 is thus returned to its normal position the contactor 56 on the end of the scale beam 4 moves out of engagement with the fixed contacts 59, 58, and 57. The disengagement of contactor 56 with fixed contact 59 has, however, no effect on the cut-off magnet valve device 23, since at this time the contact element 67 is in engagement with the contact 68 supplying current from the battery 62 to said magnet valve device which retains said magnet valve device energized and thus the supply valve 14 closed until it is again desired to draw water into the tank 1. The disengagement of the contactor 56 with the fixed contact 58 effects deenergization of the magnet of the throttling magnet valve device 51, whereupon spring 54 seats the valve 53 and unseats the valve 52 so that fluid under pressure is vented from piston chamber 42 of the throttling cylinder to the atmosphere by way of the atmospheric exhaust port 55. The return spring 47 acting on the throttling piston 41 then returns said piston to the position shown in the drawing, so that upon the next filling of tank 1 the piston rod 39 may move inwardly of the piston rod 47 as required to permit full opening of the valve 14 by piston 16.

Due to various causes, such as splashing of the water in tank 1, or to variations in force with which the water supplied said tank impinges against the tank or the water therein, there is a possibility that the scale beam 4 would be caused to oscillate slightly during the filling of the tank. Particularly at the time the contactor 56 is about to engage with the fixed contact 58, such oscillation of the scale beam would tend to cause premature engagement thereof or possibly alternate making and breaking of such electrical connection with the result that the supply valve 14 might be prematurely moved to the throttling position or alternately moved between the full open and throttling positions for a short interval of time at this period in the filling operation. A similar result would also tend to occur at about the time the contactor 56 should engage the contact 59. It will be evident that the possible effects of oscillation of the scale beam, as just described, would not only cause unnecessary operation and wear of the parts involved but would also act to undesirably delay, to some extent, the obtaining of the desired quantity of water to the tank 1, either of which would be undesirable.

In order to avoid any possible interference with the filling of the tank, as just described, means are provided to dampen oscillation of the tank 1 and scale beam 4. This dampening means is preferably in the form of a movable plunger 82 subject to the pressure of a spring 83 and adapted to engage the depending portion of the scale platform 2 just before the contactor 56 engages the contact 58. By this construction, the spring 83 will prevent movement of the scale beam 4 past the position in which said spring becomes effective until substantially the proper amount of water is obtained in the tank 1, while after the contactor 56 engages the contact 58, the increasing force of spring 83 as it is compressed by the increase in amount of water in tank 1 will act to prevent premature engagement of contactor 56 with the contact 59.

The plunger 82 and spring 83 are associated with any fixed portion of the scale, such as the portion on which the fixed fulcrum 6 is provided.

The automatic operation of the mechanism to supply water to the tank 1 may be initiated either by moving the contact element 67 to its left hand position as hereinbefore described, or if it is desired to avoid having to move said contact element against pressure of fluid on the reset piston 78, the break switch 65 may be first opened to effect deenergization of the cut-off magnet valve device 23 and consequent venting of fluid under pressure from the reset cylinder 72, following which, the contact element 67 may be moved to its left hand position independently of the reset cylinder. However, when it is desired to add water to the tank 1 after the automatic filling operation of the mechanism is completed, and the magnet of the cut-off magnet valve device 23 is energized by current supplied through the contactor 56 and contact 59, it is then necessary to operate the break switch 65 in addition to the contact element 67 since said contact element has no control over the energizing circuit of said magnet valve device and is therefore unable to effect deenergization of said magnet valve device, as required.

The fixed stops 8 are provided beneath the scale platform 2 to be engaged by said platform in the position in which the contactor 56 engages the contact 59 so as to hold the tank 1 against movement during the draining operation, if such is desired.

The piston stop 48 on the throttling cylinder 40 which defines the throttling position of the supply valve 14, is adjustable so that the intermediate position of said supply valve may be adjusted to provide any desired degree of reduced water flow to tank 1.

By the proper positioning of the contacts 58 and 59 on the contact element 60 with respect to the contact 56 it will be evident that the water supply valve 14 may be caused to move to either throttling or closed position at any desired, predetermined degree of filling of the tank 1 with water.

It will be evident that the mere manual operation of the contactor 67, or of both the switch 65 and said contactor, in the manner above described, is required to set the measuring mechanism into operation, after which its operation is automatic to fill the tank 1 with the predetermined, desired degree of water. When the desired quantity of water is thus obtained in the tank 1 the mechanism automatically operates to cut off the supply of water to the tank 1. If the predetermined quantity of water thus measured into the tank 1 is inadequate for a certain batch of aggregate, which is drier than usual, then by the mere manual operation of the switch 65 and contact element 67 the amount of water in the tank 1 may be increased at the reduced rate to that required.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, means for weighing a predetermined quantity of matter, valve means for supplying matter to be weighed to the weighing means, a movable abutment adapted to be operated by fluid under pressure for moving said valve means to a position for supplying matter to said weighing means, another movable abutment adapted to be operated by fluid under pressure for moving said valve means to another position for closing off the supply of matter to said weighing means, manually controlled means for supplying fluid under pressure to move the first named abutment, and means automatically operative upon a predetermined loading of said weighing means with matter to supply fluid under pressure to the second named abutment for effecting movement thereof.

2. In combination, means for weighing a predetermined quantity of matter, valve means for supplying matter to be weighed to the weighing means, a movable abutment adapted to be operated by fluid under pressure for effecting movement of said valve means to an open position for supplying matter to said weighing means, another movable abutment adapted to be operated by fluid under pressure for moving said valve means from the open position to a partially open or throttling position, manually controlled means operative to supply fluid under pressure to the first named abutment for moving said valve means to the open position, means operative automatically upon a predetermined increase in the load of matter on said weighing means to supply fluid under pressure to the second named abutment for moving said valve means to said throttling position, and means automatically operative upon a predetermined further increase in the load of matter on said weighing means for supplying fluid under pressure to the first named abutment for effecting movement of said valve means to a closed position for cutting off the supply of matter to the weighing means.

3. In combination, means for weighing a predetermined quantity of matter, valve means for supplying matter to be weighed to the weighing means, a movable abutment adapted to be operated by fluid under pressure acting on one face to effect movement of said valve means to an open position for supplying matter to said weighing means, and adapted to be operated by fluid under pressure acting on the opposite face to effect movement of said valve means to a closed position, another movable abutment adapted to be operated by fluid under pressure to effect movement of said valve means from the open position to a partially open or throttling position, adjustable means for defining said throttling position, manually controlled means operative to supply fluid under pressure to the first named abutment to effect movement of said valve means to open position, means operative automatically upon a predetermined increase in the load of matter on said weighing means for supplying fluid under pressure to the second named abutment to move said valve means to said throttling position, and means automatically operative upon a predetermined further increase in said load of matter for venting the fluid under pressure from said one face of the first named abutment and for supplying fluid under pressure to the opposite face thereof for moving said valve means to said closed position.

4. In combination, means for weighing a predetermined quantity of matter, valve means having an open position for supplying matter to be weighed to the weighing means, a throttling position for reducing the rate of supply of matter to said weighing means, and a closed position for cutting off said supply, a double acting piston connected to said valve means and adapted to be operated by pressure of fluid acting on one face to move said valve means to said open position and by pressure of fluid acting on the opposite face to move said valve means to closed position, another piston of greater area than the first named piston adapted to be operated by pressure of fluid on one face to move said valve means from open position towards closed position, means for limiting the stroke of the larger piston and thereby the degree of closing of said valve means, manually controlled means operative to supply fluid under pressure to the double acting piston for moving said valve means to open position, means automatically operative upon a predetermined loading of said weighing means with matter to supply fluid under pressure to said larger piston for moving said valve means to the partially closed position, and means automatically operative upon a predetermined further loading of said weighing means with matter for releasing the manually supplied fluid pressure from the one face of said double acting piston and for supplying fluid under pressure to the opposite face of said double acting piston for moving said valve means to closed position.

5. In combination, means for weighing a predetermined quantity of matter, valve means having an open position for supplying matter to be weighed to the weighing means, a throttling position for restricting such supply and a closed position for cutting off said supply, a double acting piston connected to said valve means and adapted to be operated by pressure of fluid acting on one face to move said valve means to said open position and by pressure of fluid acting on the opposite face to closed position, another piston of greater area than the first named piston adapted to be operated by pressure of fluid on one face to move said valve means from open position to throttling position, means for limiting the stroke of the larger piston and thereby the degree of closing of said valve means, manually controlled electro-responsive means operative upon energization to supply fluid under pressure to said one face of said double acting piston for moving said valve means to open position, other electro-responsive means operative upon energization to supply fluid under pressure for effecting operation of said larger piston, means automatically operative upon a predetermined increase in the load of matter on said weighing means for effecting energization of said other electro-responsive means, electrically controlled means operative upon energization to effect deenergization of said manually controlled electro-responsive means and also to supply fluid under pressure to said opposite face of said double acting piston, and means automatically operative upon a predetermined further increase in the load of matter on said weighing means to effect energization of said electrically controlled means.

6. In combination, means for weighing a quantity of matter, means for supplying matter to be weighed to the weighing means, manually controlled means operative to effect operation of the supply means to supply matter to said weighing means, means controlled by the load of matter on said weighing means and automatically operative upon a predetermined increase in said load to effect operation of said supply means to cut off the supply of matter to said weighing means, manually controlled means operative after the cut-off operation of said supply means to again effect operation thereof to supply matter to said weighing means, and means conditioned upon a predetermined loading of said weighing means for restricting the supply of matter to said weighing means through said supply means upon operation of the second named manually controlled means.

7. In combination, means for weighing matter, means for supplying matter to be weighed to the weighing means, manually controlled means having a normal position and movable thereupon to effect operation of the supply means for supplying matter to the weighing means, means controlled by the load of matter on said weighing means automatically operative upon a predetermined increase in the degree of said load to effect operation of said supply means to cut off the supply of matter to said weighing means and to effect movement of said manual means to its normal position, other manually controlled means cooperative with the first named manually controlled means after the cut-off operation of said supply means to again effect operation of said supply means to supply matter to said weighing means, and means conditioned upon a predetermined, initial loading of said weighing means for restricting the rate of supply of matter through said valve means upon operation thereof by the cooperative action of the two manually controlled means.

8. In combination, means for weighing matter, valve means for supplying matter to be weighed to said weighing means, electro-responsive means operative to effect operation of said valve means to supply matter to said weighing means, manual means movable manually to one position for effecting said operation of said electro-responsive means, electrically controlled means for effecting operation of said valve means to cut off the supply of matter to said weighing means, and means controlled by the load on said weighing means and operative automatically upon a predetermined loading thereof to effect said operation of said electrically controlled means, said manual means having another position for effecting said operation of said electrically controlled means, and means operative upon operation of said electrically controlled means for moving said manual means to said other position.

9. In combination, means for weighing a quantity of matter, valve means for controlling a supply of matter to be weighed to the weighing means and having an open position for supplying matter to said weighing means at one rate, a throttling position for supplying matter to said weighing means at a reduced rate and a closed position for cutting off the supply of matter to said weighing means, a supply magnet valve device for effecting movement of said valve means to said open position, manually controlled means movable from a normal position for effecting operation of said magnet valve device, a magnet valve device operative to effect movement of said valve means to said throttling position, a cut-off magnet valve device operative to effect movement of said valve means to the closed position and to also effect movement of said manually controlled means to said normal position, and means operative automatically upon a predetermined degree of loading of said weighing means with matter for effecting operation of the throttling magnet valve device and upon a further predetermined degree of loading to effect operation of said cut-off magnet valve device and also to effect movement of said manually controlled means to normal position.

10. In combination, means for weighing a quantity of matter, a valve for supplying matter to be weighed to the weighing means and movable from a closed position to a partially open position for supplying matter to said weighing means at a restricted rate, and movable further to a fully open position for supplying matter to said weighing means at a greater rate, a rod for moving said valve, a double acting piston adapted to be operated by fluid under pressure supplied to one side for operating said rod to move said valve to the full open position and adapted to be operated by fluid under pressure supplied to the opposite side for operating said rod to move said valve to the closed position, a single acting piston adapted to be moved by fluid under pressure, stop means for limiting the movement of said single acting piston, a lever connected to said rod and movable therewith relative to said single acting piston upon movement of said valve to the full open position, said single acting position being adapted to be moved by fluid under pressure into engagement with said stop and operative during such movement to move said lever and thereby said rod and said valve to said partly open position, manually operative means for effecting the supply of fluid under pressure to the side of said double acting piston for moving said valve to the full open position, means controlled by the load of matter on said weighing means operative automatically upon a predetermined increase in said load to supply fluid under pressure to said single acting piston for effecting operation thereof, and operative upon a predetermined further increase in said load to supply fluid under pressure to the side of the said double acting piston for moving said valve to the closed position and for also, at the same time, effecting the venting of fluid from the pressure from the opposite side of said double acting piston.

GEORGE W. MISNER.